United States Patent Office 3,443,829
Patented May 13, 1969

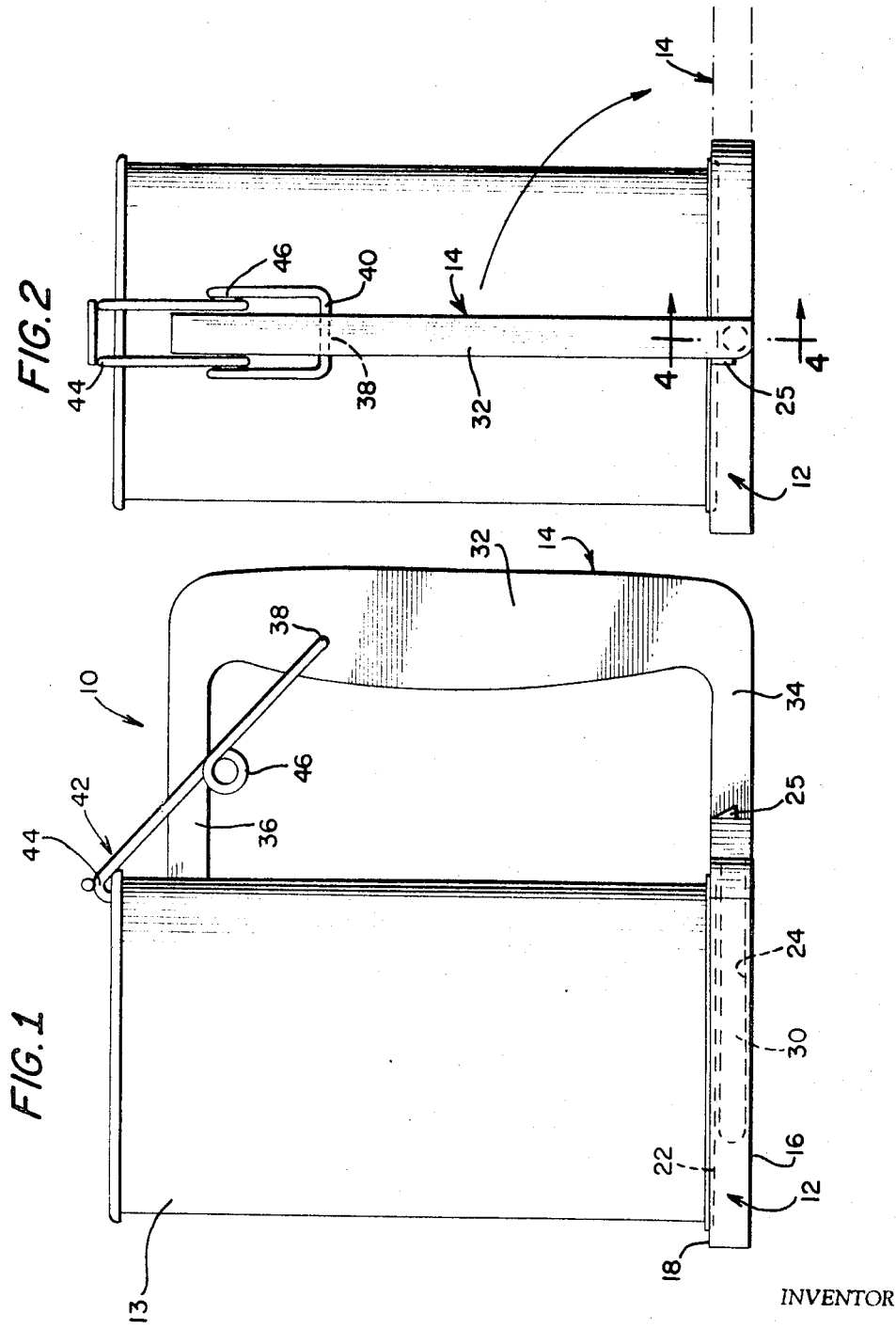

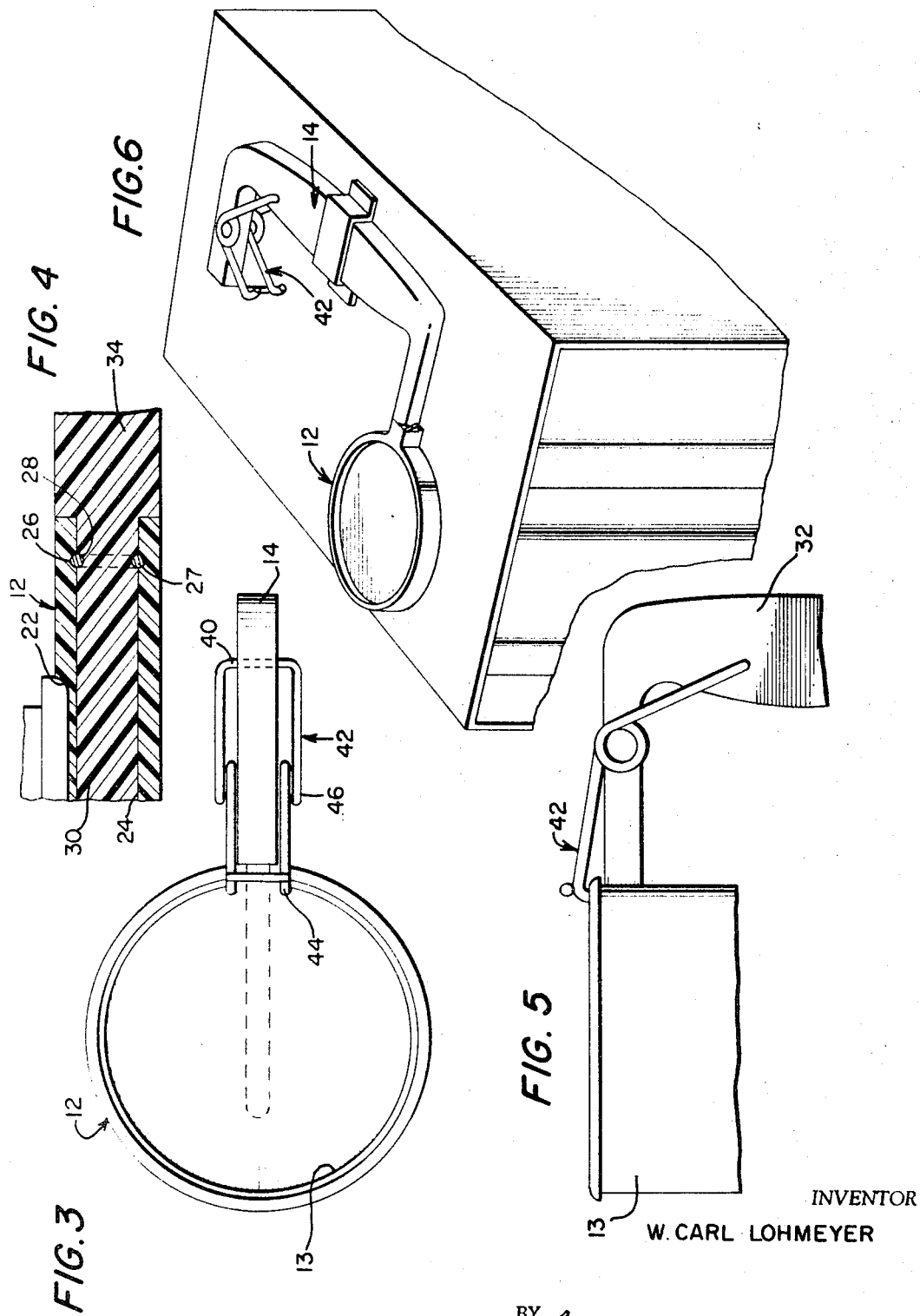

3,443,829
FOLDABLE COASTER AND HANDLE DEVICE FOR USE WITH CAN-LIKE CONTAINERS
W. Carl Lohmeyer, 6318 Mossway, Baltimore, Md. 21212
Filed Jan. 17, 1967, Ser. No. 609,914
Int. Cl. A47j *45/06;* B65d *23/10*
U.S. Cl. 294—32               2 Claims

ABSTRACT OF THE DISCLOSURE

A coaster and handle device for use with cans with the handle rotatable to the plane of the coaster presenting a flat object for stacking or storage.

Background

The invention relates to a coaster and handle device for use with can-like objects and more particularly to a new and improved device having a handle rotatable to the plane of the coaster base so as to facilitate convenient storage and to present a substantially flat object facilitating its attachment to cartons or other packaging arrangements.

Can holders which include a can rest or coaster section with a rigidly attached handle for forming with the can a muglike container have been known for some time. However, these known devices suffer from the disadvantage of being bulky and not suitable for stacking. Of equal importance, due to their bulk, these known devices as a practical matter cannot be attached conveniently to 6-pack cartons of beer or soft drink beverages or other packaging arrangements now commonly on the market.

Summary of the invention

The device according to the invention solves the problems mentioned above by providing for relative rotation between the handle and coaster parts so that these parts can be rotated to the same plane for storage. Thus, a device according to the invention presents a flat object when not in use thus facilitating stacking a number of such devices and making practical the attachment of one of these devices to a 6-pack carton or other packaging arrangement, either by exterior securing means or by its inclusion within the package.

Briefly described, the invention includes a coaster or base for receiving a can-like container and an endless shallow groove to prevent lateral movement of the can on the coaster. A normally upstanding handle is coupled to the coaster by a pin and socket arrangement permitting the handle to rotate into the plane of the coaster. The handle is provided with a member to securely but releasably couple the handle to the can.

It is therefore an object of the invention to provide a coaster and handle device of the type described which has a handle rotatably connected to the coaster permitting the handle and coaster to lie generally in the same plane for storage or shipment.

Drawing description

Other and further objects of the invention will become apparent with the following detailed description when taken in view of the appended drawings in which:

FIGURE 1 is a side elevation of the invention with the can mounted thereon;
FIGURE 2 is a front elevation of FIGURE 1, partially illustrating the folded handle position in phantom;
FIGURE 3 is a top plan of FIGURE 1;
FIGURE 4 is a partial vertical section taken along line 4—4 of FIGURE 2;
FIGURE 5 is a partial side elevation illustrating the handle top and a can of different size than that of FIGURE 1;
FIGURE 6 is a diagrammatic illustration of the invention secured to a beverage packaging arrangement.

Embodiment description

With reference to the drawings, one embodiment of the inventive device generally indicated as 10 which includes a coaster or base 12 to receive and support in an upright position a can-like container 13 and an upstanding handle 14. It is apparent from FIGURE 1 that device 10 forms with container 13 a mug-like object which during normal drinking use is periodically lifted from and replaced on a flat surface.

The coaster 12 of device 10 is in the form of a circular disk of uniform thickness having a flat bottom 16 and top surface 18. In order to prevent relative lateral movement between the bottom of can 13 and coaster 12, an endless groove 22 is defined in surface 18 and is designed and dimensioned to receive the bottom lip of the can.

For purposes described below, an elongated bore-like socket 24 extends through the side wall of coaster 12 and penetrates a substantial part of the coaster along a diameter thereof. A groove 26 is provided near the open end of socket 24. See FIGURE 4.

Handle 14 includes an upstanding grip 32 shaped to fit the hand having a thickness preferably equal to the thickness of coaster 12 so as to present a uniformly thick object when rotated to the stored position. The lower handle end 34 extends toward coaster 12 and terminates in an elongated cylindrical pin 30 carrying an expansion ring or spring 27 in a suitable groove 28. To assemble the parts, the free end of pin 30 is inserted into socket 24. After being depressed, spring 27 moves into the socket and expands into groove 26 when aligned therewith. In this way, socket 24 and pin 30 form the axis of rotation for the handle 14 which by virtue of spring 27 is locked to coaster 12. The sidewall of coaster 12 may be provided with a lip 25 acting as a stop to limit the handle rotation to the vertical position.

Handle 14 is further provided with an abutment 36 serving to contact the sidewall of can 13. In order to couple the handle 14 to can 13 and maintain mutual contact between abutment 36 and the sidewall of the can, a clip spring 42 is provided with one end held by handle 14 and the other end gripping the top lip of the can. Spring 42 is provided with a crossleg 40 rotatably held in a transverse bore 38 of handle 14 and a free, hook-like end 44 shaped to overlap the can upper lip. The spring action is provided by a looped coil 46 formed at about the midlength of spring 42 which resiliently draws crossleg 40 and free end 44 together. Not only does this force maintain the abutment and can sidewall contact as described but it also enhances the seating of the bottom can lip within groove 22. It should be appreciated that cans of different height can be accommodated by virtue of the adjustability of spring 42. See FIGURES 1 and 5.

Coaster 12 and handle 14 are preferably formed of molded plastic, but any other suitable material such as wood, paper, metal, or the like, may be used. Spring 42 is formed by a suitable metal. The thickness of coaster 12 and handle 14 should be suitably small so that when the handle 14 is rotated to the plane of coaster 12, the device only has a thickness at the point of the spring of about one-quarter inch to one-half inch. It is anticipated that devices made according to the invention have particular utility as advertising give-away items in which case suitable indicia may be printed on handle 14 and the surfaces of coaster 12.

In operation, the consumer receives the device in the stored condition wherein handle 14 is rotatably but securely attached to coaster 12 and these parts lie in the same plane. After placing a can of beverage on coaster 12 so that the bottom lip fits in groove 22 and rotating handle 14 to an upstanding position, spring 42 is pulled upward and across so that the free end 44 overrides the upper lip of the can. At this time spring 42 is released so as to increase the contacting forces between abutment 36 and the sidewall of the can. The device is now ready for use.

When can 13 is empty, spring 42 is disengaged from the can and the can is removed. After this, another can may be attached to the device or the handle 14 may be rotated to the horizontal so that the device 10 is ready for storage or stacking.

With reference to FIGURE 6, because of the flatness of the device in its stored position, it can be conveniently attached as part of and along with the packaging arrangement such as a cardboard 6-pack of beer or soft beverage.

Thus there has been disclosed a coaster and handle device in which the handle is pivoted to the coaster so as to lie in the same plane therewith to facilitate storage, stacking, or attachment to cartons or other packaging arrangements. It will be appreciated that various changes and modifications can be made to the herein disclosed example of the present invention without departing from the spirit and scope thereof.

What is claimed is:

1. A detachable coaster and handle device for use with a can-like container comprising a substantially circular disc forming a base to receive and support the bottom of the container in an upright position, said base having means to restrain relative lateral movement of the container bottom, an elongated handle having at its lower end a pin disposed within a bore provided in said disc, said pin extending generally through the center of the disc and being rotatable within said bore, spring means disposed within said bore and engaging a portion of said pin to prevent inadvertent removal of said pin from said bore while enabling said pin to rotate within said bore, said handle having at its upper end an abutment for contacting the upper side wall of the container during use, and spring means connected to the upper end of said handle and engaging an upper portion of the container to urge said abutment and the container wall into contacting engagement while exerting a force upon said can towards said base.

2. A device according to claim 1, wherein the means to restrain relative lateral movement of the container bottom comprises an endless groove provided in the base to receive a bottom lip portion of the container, and wherein said spring means includes at one end means pivotally mounted in aperture means provided in the side of said handle adjacent the upper end thereof, at least one intermediate coiled spring portion disposed adjacent one side of said handle, and at the other end thereof hook like means to engage behind an upper lip portion of the container.

References Cited

UNITED STATES PATENTS

| 2,344,186 | 3/1944 | Upham | 294—32 |
| 2,676,832 | 4/1954 | Keither | 294—31.2 |
| 3,074,678 | 1/1963 | Mele | 294—32 |
| 3,202,309 | 8/1965 | Simpson. | |
| 3,261,635 | 7/1966 | Talay | 294—29 |

EVON C. BLUNK, *Primary Examiner.*

HARVEY C. HORNSBY, *Assistant Examiner.*

U.S. Cl. X.R.

215—100